United States Patent [19]

Feigenbaum et al.

[11] Patent Number: 4,718,005

[45] Date of Patent: Jan. 5, 1988

[54] DISTRIBUTED CONTROL OF ALIAS NAME USAGE IN NETWORKS

[75] Inventors: Barry A. Feigenbaum, Deerfield Beach; Dennis D. Gibbs, Lighthouse Point; Robert Sachsenmaier, Boca Raton, all of Fla.

[73] Assignee: International Business Machines Corporation, Armonk, N.Y.

[21] Appl. No.: 604,684

[22] Filed: May 3, 1984

[51] Int. Cl.$^4$ .............................................. G06F 15/16
[52] U.S. Cl. ...................................... 364/200; 370/94; 340/825.52
[58] Field of Search ............. 340/825, 825.05, 825.07, 340/825.52, 825.03; 370/85, 94; 364/200 MS File, 900 MS File

[56] References Cited

U.S. PATENT DOCUMENTS

| | | | |
|---|---|---|---|
| 4,112,488 | 9/1978 | Smith, III ........................ | 364/200 |
| 4,423,414 | 12/1983 | Bryant et al. .................. | 340/825.07 |
| 4,597,078 | 6/1986 | Kempf ............................. | 370/85 X |

Primary Examiner—Gary V. Harkcom
Assistant Examiner—David L. Clark

[57] ABSTRACT

Computer systems linked to nodes in a communication network communicate directly with each other to establish name associations for entities (e.g. programs, storage files, etc.) susceptible of being shared across the network, and thereafter communicate further by names (rather than addresses) to establish sessions (i.e. logical connections over the network) between entities. Each system maintains a table of names assigned to locally accessible entities. The name and session establishment processes are architected to avoid dependence on any "central" or "master" system, and to allow for extension of communications relating to these processes across devices linking portions of the network associated with different communication media or channels.

9 Claims, 18 Drawing Figures

NETWORK CONTROL BLOCK (NCB)
(65 Bytes)

Legend:
  CMD = Command
  RC  = Return Code
  LSN = Local Session
        Number
  NUM = Alias Name Number
  RTO = Receive Message
        Timeout
  STO = Send Message
        Timeout
  POST= Address Of "POST"
        Routine FIG. 7
(a) Name Check (Sent By Node n):
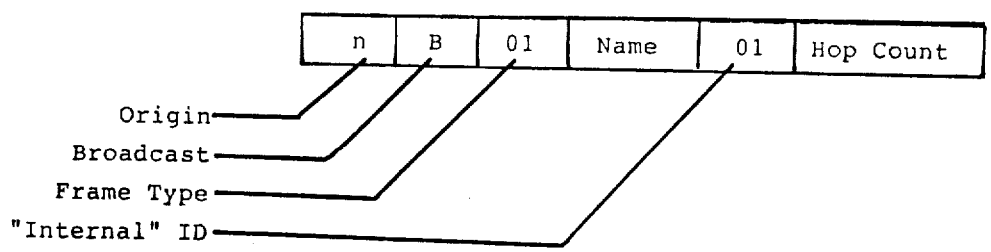
(b) Name Check Acknowledgement (From Node m):
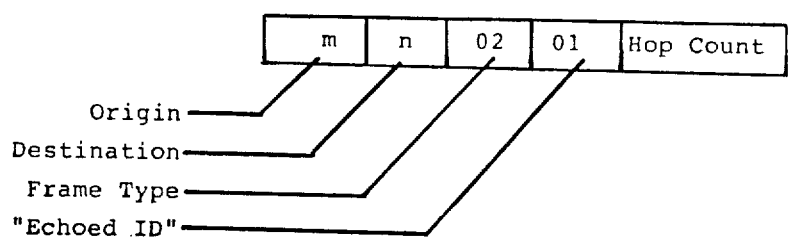
(c) Duplicate Use Frame (From Node n):
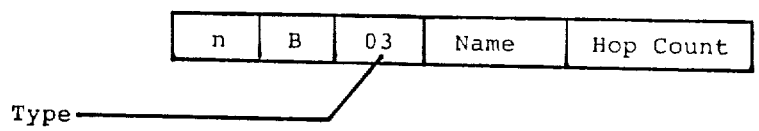
(d) Call Name Check (From Node n):
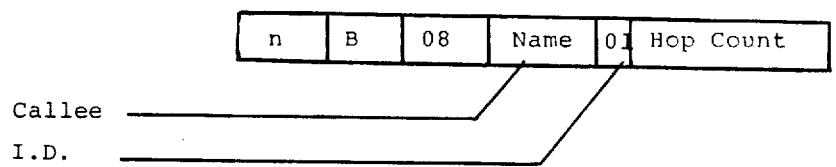
(e) Call Name Check Acknowledgment
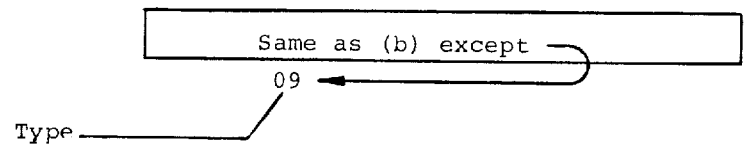

FIG. 8    CALL NCB
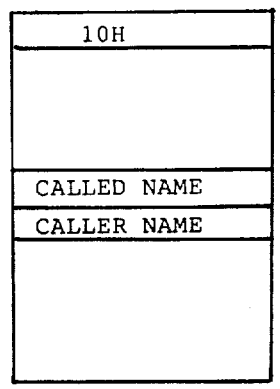
FIG. 15    LISTEN NCB
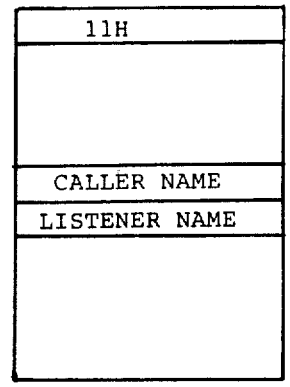
FIG. 10    SESSION TABLE FORMAT
| (1) | (1) | (16) | (n) | ← # Of Bytes |
|---|---|---|---|---|
| SESSION STATUS | LOCAL NAME # | REMOTE NAME | OTHER INFORMATION | |
↕ 32 ENTRY SPACES

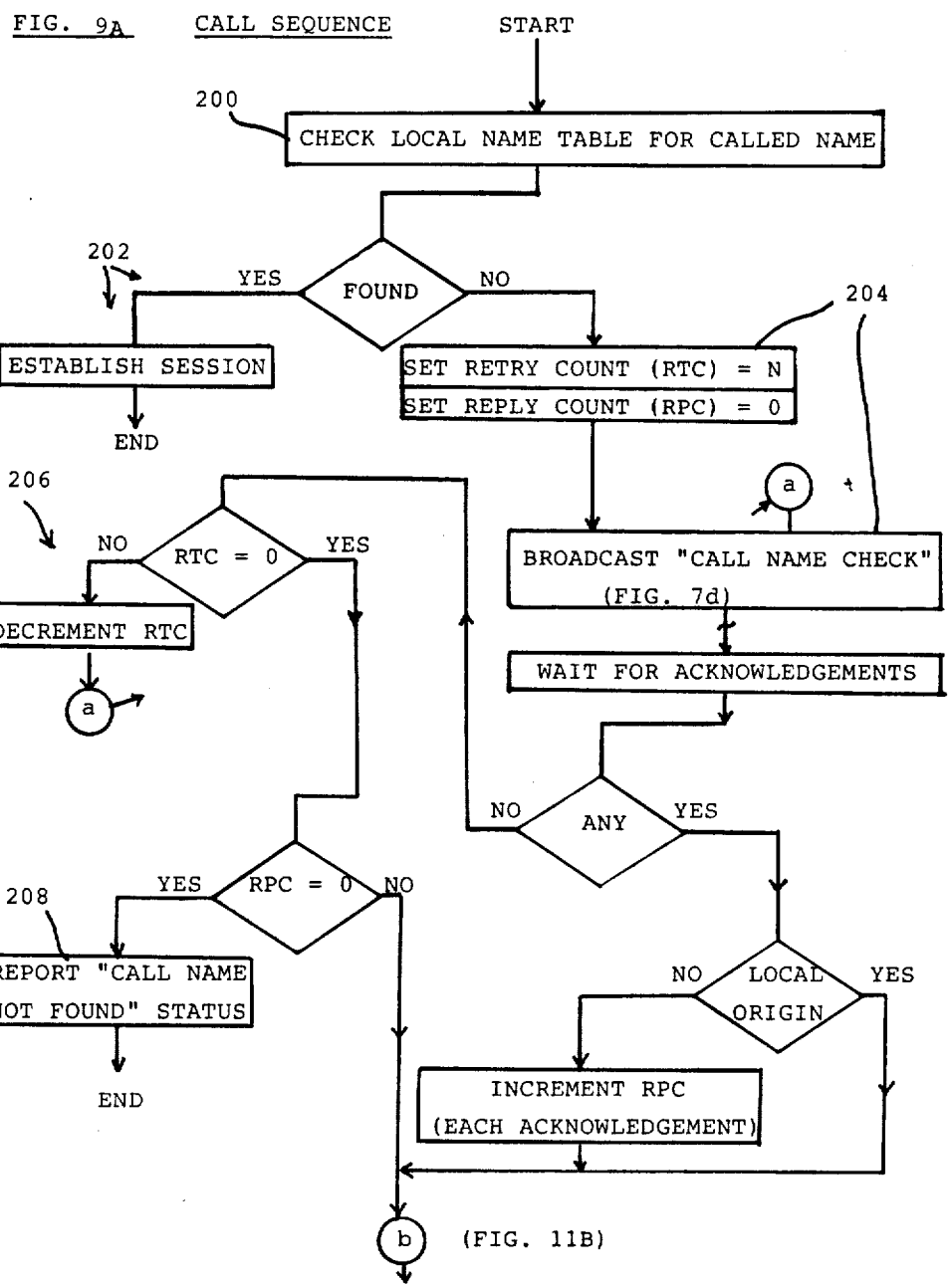
FIG. 9A  CALL SEQUENCE

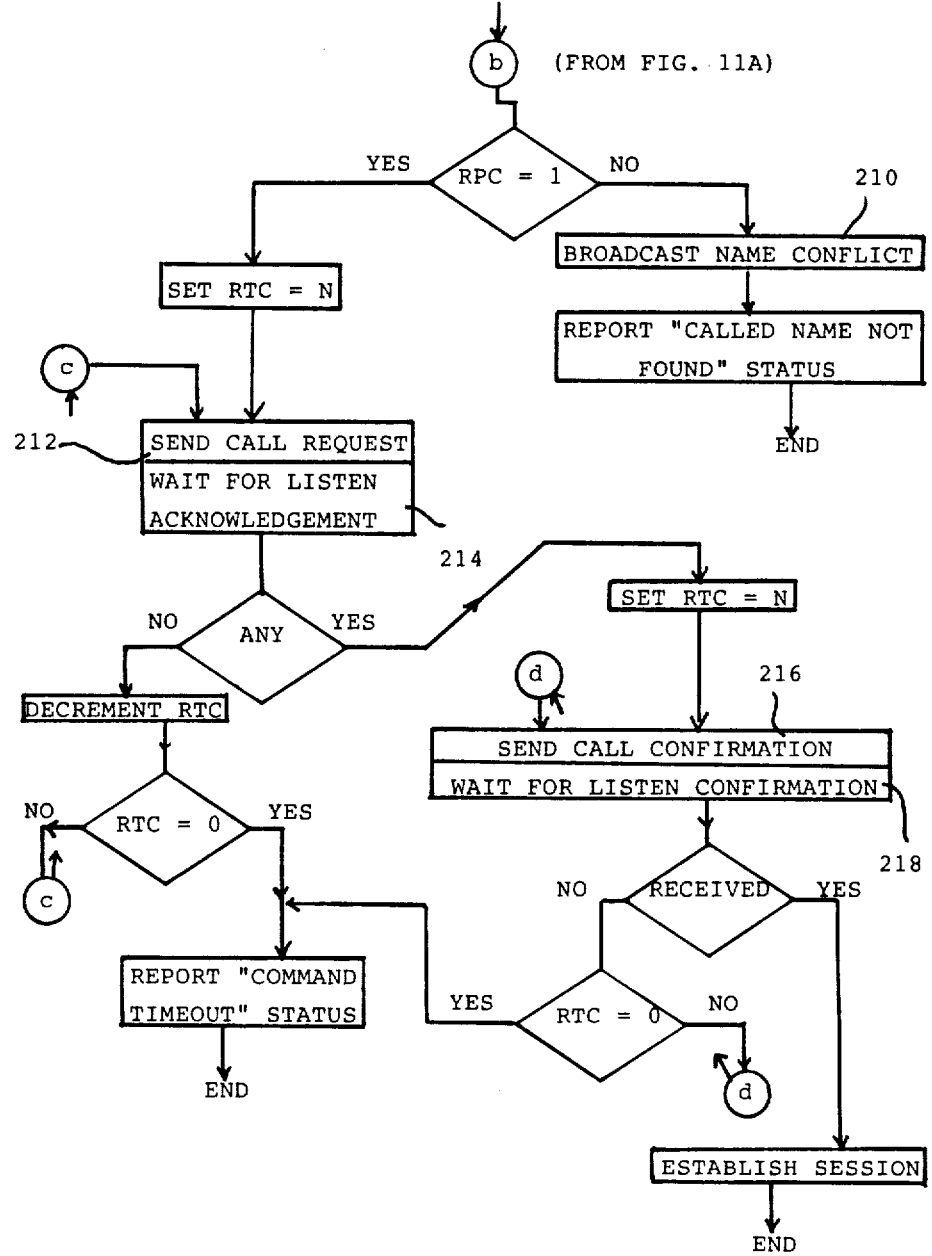
FIG. 9B   CALL SEQUENCE (CONTINUED)

FIG. 11 CALL REQUEST FORMAT:
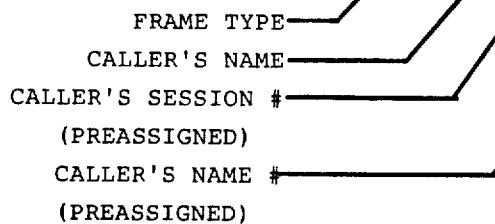
FRAME TYPE
CALLER'S NAME
CALLER'S SESSION # (PREASSIGNED)
CALLER'S NAME # (PREASSIGNED)
FIG. 12 LISTEN ACKNOWLEDGEMENT:
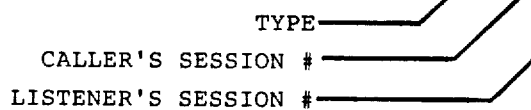
TYPE
CALLER'S SESSION #
LISTENER'S SESSION #
FIG. 13 CALL CONFIRMATION:
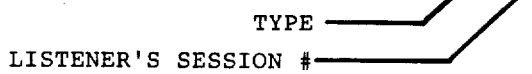
TYPE
LISTENER'S SESSION #
FIG. 14 LISTEN CONFIRMATION:
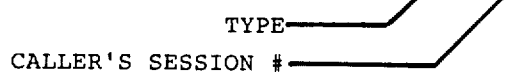
TYPE
CALLER'S SESSION #
FIG. 17
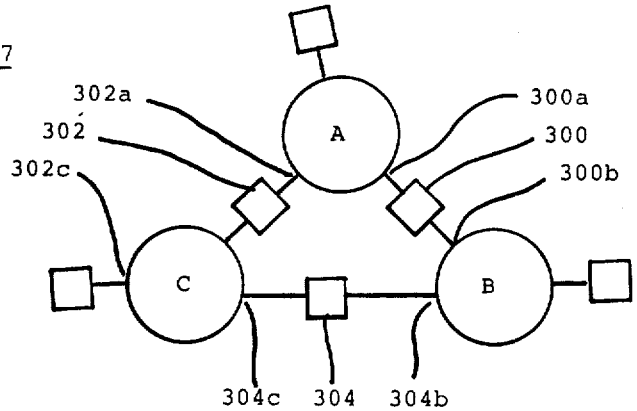

FIG. 16  LISTEN COMMAND SEQUENCE
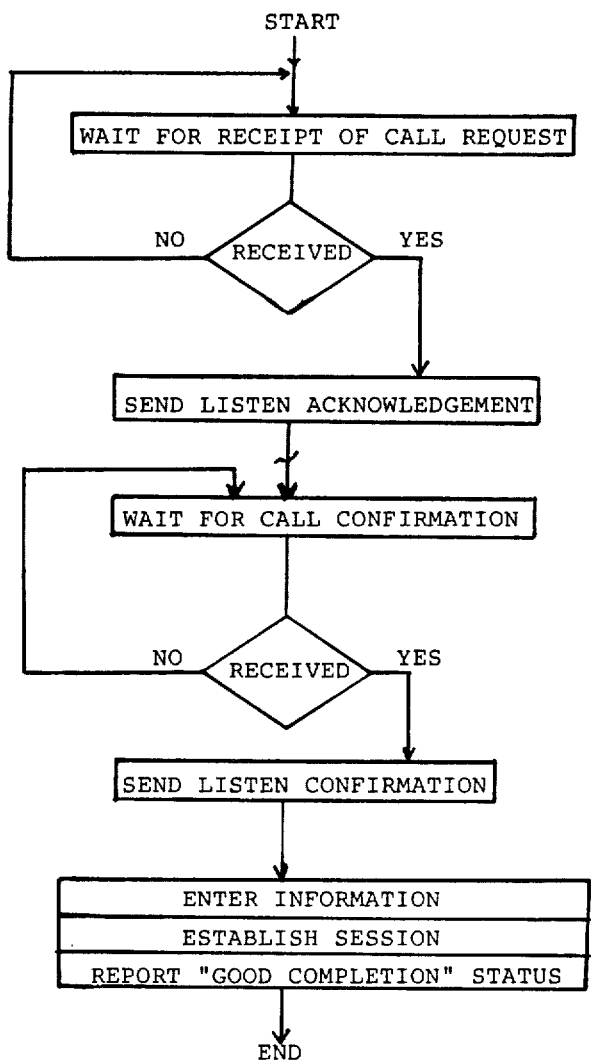

DISTRIBUTED CONTROL OF ALIAS NAME USAGE IN NETWORKS

BACKGROUND OF THE INVENTION

This relates to use of alias/logical names, in place of physical addresses, for establishing communications between entities in a data processing network (storage resources, human operators, etc.). More particularly, it relates to methods for enabling computing nodes in a network to operate as peers in respect to creating and using such names (i.e. communicate directly with each other), and thereby avoid reliance on a central or master communication node whose failure could prevent further name handling activities.

Existing distributed data processing networks have taken a centralized approach to support of alias name usage. This entails translations of messages directed to named entities into messages directed to network address locations at which respective entities are physically located.

This tends to increase the volume of communication traffic required to be handled by the network, as well as to increase the probability of error in any one communication dependent on such translation. Furthermore, if the translations from name-directed messages to location-directed messages are carried out by a "master" computing system at one node, failure of the latter system could disable the network.

The present invention seeks to avoid these difficulties by using a distributed approach to creation of names and the use of names for communication. It does not require a central directory, although it does not preclude use of such.

SUMMARY OF THE INVENTION

This invention permits data processing systems linked to nodes of a communication network to create and use alias names on a distributive basis, and thereby to sustain data communications between resources known by various names, and distributed throughout the network, without dependence on a central or master directory.

In accordance with the present invention, processing facilities at all network nodes maintain tables of names currently assigned to respectively associated entities (human operators, storage resources, internal processes, etc.) as references for distinguishing name uniqueness and establishing sessions (i.e. logical connections) between entities identified by names (rather than fixed addresses).

A processing facility at a node creates a unique name association as follows. First, it checks the local table and selects another name if the name is already assigned locally. If the name is not duplicated locally, it broadcasts a "Name Check" request message throughout the network for effectively extending the duplication check to the tables at all other nodes. Important aspects of this two-step procedure for checking name uniqueness are that: (a) the network is not burdened by Name Check communications if the name is locally duplicated; and (b) the local Name Check is transparent to local applications and operating system functions so that those functions are not burdened by name creation operations.

A node receiving a Name Check request returns an acknowledgment to the requesting node only if the former node detects a duplicate entry in its name table. The acknowledgment informs the checking node of the existing name usage, and prevents it from establishing a conflicting use.

The requesting node repeats the Name Check request communication several times, and if it receives no acknowledgments on all tries, it adds the name to its table. If it receives more than one acknowledgment on any try (i.e. if two or more other nodes have the proposed name in their tables), the requesting node broadcasts a "Duplicate Use" message which effectively indicates that other nodes may have a conflict in respect to the specified name. The nodes which acknowledged the Name Check request recognize this, mark their respective name table entries as subject to conflict, and take measures to avoid further usage of the affected name until the conflict is resolved.

The use of such "Name Check" and "duplicate use" messages does not prevent a node from having more than one name, provided that each name has verifiable/maintainable uniqueness.

Other important aspects of the present invention relate to the method disclosed for establishing sessions (i.e. logical connections) between paired "calling" and "called" entities, and applications thereof for permitting nodes to share resources by name identity with minimal burdening of processing systems directly serving such resources.

As in the Name Check procedure outlined above, the session establishment process is organized to avoid burdening network media with communications when entities to be linked are both at the same node. A node initiating a session establishment process checks its local name table, and extends the process through the network only if the called entity is not local. If both entities are local, the session is established internally; i.e. without any communication on network media.

The present name creation and session establishment processes can be implemented either in a primary processor, or off-loaded to a secondary processor which controls network access. This involves choices, conditioned on cost/performance tradeoff, which do not change the basic processes.

In the preferred embodiment to be described, session establishment is conditioned on the called entity having a unique name, and on its being in a prepared or "listening" state defined below. If the called entity is not local, the node serving the calling entity verifies the uniqueness of the called entity's name by broadcasting a Name Check request through the network. The session establishment process is aborted if the called entity's name is either non-existent or not unique (no acknowledgment or more than one acknowledgment returned in response to the Name Check). If the name is unique, or if both entities are local, the session establishment process is continued.

In this embodiment, an entity is placed in "listening" status (i.e. prepared for session establishment) by execution of a Listen Command in the processing facility serving that entity. The command identifies the names of the local entity to be placed in listening status and it may restrictively identify a calling entity (by name), either local or remote, to which the listening entity is receptive for session establishment purposes. A Session Table maintained at the node is marked to indicate that the respective entity is in listening status, and the processor serving that entity is thereby conditioned to respond positively to a suitably originated Session Establishment request. This procedure for creating listening status can be used by the nodes to regulate their network communication loads and their contention for resources.

If a session originating node finds that the called entity is not local, and verifies through the Name Check that that entity's name is unique (one and only one acknowledgment returned), it continues the session establishment process by sending a Call Request message through the network directly addressed to the node which acknowledged the Name Check. If the session can be accommodated, the addressed node marks its session table to indicate a "session establishment process" status for the called entity, and acknowledges the Call Request with a "Listen Acknowledgment" response indicative of that status. If the called entity is unavailable for session establishment, its node responds to the Call Request with a "Not Listening" acknowledgment.

This request and acknowledgment process is repeated several times, and if each try results in either no answer or a negative response, the calling node aborts the session establishment process. If the called entity is in listening status, the associated Listen Acknowledgment invites the calling node to complete the establishment process. For this purpose, the calling node sends a Call Confirmation message to the called node, and if this is properly received, the latter node responds with a Listen Confirmation message concluding the establishment process. Although not essential to the session establishment process, these confirmations are useful in that they tend to make the process more reliable.

With the Call Request and Listen Acknowledgment communications, the calling and called nodes exchange session numbers to be associated with their entities. They enter these numbers into respective session tables for use in directing subsequent session communications. Following the Listen Confirmation, communications sent in either direction between the paired entities are specifically addressed to the respective nodes and distinguished by the session number (consequently, a single pair of entities could have several distinctly separate sessions in process concurrently). Once established, the reliability of a session may be enhanced by periodic exchange of communications requesting verification of active session status when no data transfers have occurred.

These and other features, aspects and advantages of our invention will be more fully understood and appreciated by considering the following detailed description and claims.

DESCRIPTION OF THE DRAWINGS

FIGS. 7a–7d illustrate various types of network communication frames used in the present name creation process;

FIG. 8 illustrates an NCB for session establishment;

FIGS. 9A–9B illustrate process sequences for session establishment;

FIG. 10 illustrates a session table;

FIG. 11 illustrates a Call Request frame for session establishment;

FIG. 12 illustrates a Listen Acknowledgment frame for session establishment;

FIG. 13 illustrates a Call Confirmation frame for session establishment;

FIG. 14 illustrates a Listen Confirmation frame for session establishment;

FIG. 15 illustrates an NCB for setting listen status;

FIG. 16 shows the process flow sequence for setting listen status; and

FIG. 17 shows a multi-network topology useful for explaining the need for "hop count" restrictions in systems allowing for passage of present name check and session establishment communications across networks.

DETAILED DESCRIPTION OF THE INVENTION

1. Introduction

For obvious purposes, such as security, distributed data processing systems have been organized to require clearance of access to the system through a single checking facility, one usually located at an access node on a communication medium or channel shared by the processing nodes.

Typically, access to such systems has been controlled by a central facility via "Login" commands and passwords. Such systems have evolved to permit designation of authorized operators by password names and designation of resources by either addresses representing physical locations, or logical names having no direct relation to physical locations. Concommitantly, the central facility for access control has evolved to maintain a directory of names and resources available to each name, and to control access to such resources through network communications and references to the directory.

Control centers of this type are difficult to manage and have inherent limitations tending to adversely affect system performance and availability. They require supervisory software or the equivalent for keeping track of associations between names and physical entities and address locations, and if a center fails it incapacitates the whole network. Even systems adapted for automatic relocation of the central control function on failure are incapacitated for substantial intervals of time during relocation. Such control centers also generally require dedication of a discrete processing facility or unit to the central control function, which for obvious reasons is inefficient.

For these reasons we have devised the present distributed system for controlling name usage and allocation of resources. Our system does not preclude existence or usage of a central control, but it does not require such. In our system, resources and entities (processors, storage files, human operators, etc.) are associated by names with access nodes to network media through which they may communicate directly (i.e. without central translation of names to addresses).

Figure 1:
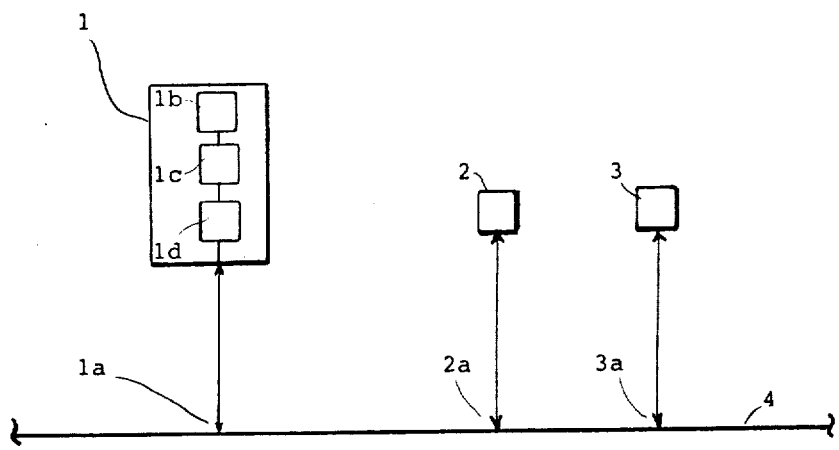
FIG. 1 is a schematic illustration of a network environment adaptable to the present invention.

In this environment, a most primitive form of which is suggested in FIG. 1, collections of physically separated data handling resources and other entities 1-3 are communicatively linked via bus 4 into a distributed data processing network. Each collection interfaces to the bus at a respective access node 1a-3a. As typified at 1, the equipment at any access node may comprise a hierarchy of primary ("host") processing equipment 1b, secondary processing equipment 1c serving as a communication I/O controller, and transceiving elements 1d for interfacing directly to the medium. Equipment 1b, 1c may couple to not-shown peripheral devices (in addition to the network bus 4), and thereby provide for communication between these devices and the bus. Bus 4 may be either a continuous line (forming e.g. a carrier sense multiple access local area net), or several line segments forming a ring or star type network, or a free space radio link between microwave repeaters or between such repeaters and an orbiting earth satellite.

Depending on the processing resources available at a node, the processing functions required at that node for name and resource management may be variously apportioned between the primary and secondary processors. If the secondary processor is a specialized I/O controller, these functions could be concentrated entirely in the primary processor, whereas if the secondary processor includes a general purpose computer with sufficient capacity it could be programmed to handle many of these functions. A node with extensive secondary processing capacity would be more expensive to construct and maintain than a node having only a highly specialized I/O controller, but this expense would generally be offset by the performance advantages realizable through the freeing up of the primary processor for other processing functions.

Figure 2:
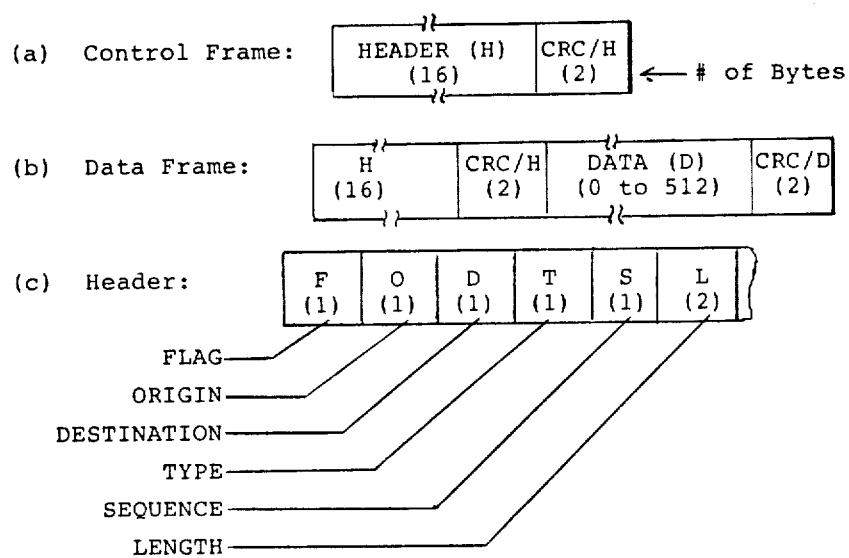
FIG. 2 illustrates exemplary frame formats for conducting communication between nodes in the environment network of FIG. 1.

In this environment, the processing facilities at the network nodes (1a, 2a, 3a, . . . ) exchange control information and data in discrete packets or frames having formats exemplified in FIG. 2. Control frames (FIG. 2a), consist of a fixed length header H, followed by a Cyclic Redundancy Check character CRC/H for checking the preceding information content. Data frames (FIG. 2b), include a fixed length header portion H, followed by a variable length data portion D. The data portion concludes with a cyclic redundancy check character, CRC/D. The header position optionally concludes with an intermediate check character CRC/H. If the intermediate check character is provided, it and the CRC/D character are used for verifying respective portions H and D. If the intermediate character is not provided, the final character CRC/D is used for verifying all preceding information. Control frames are used for requesting controlling actions and acknowledging frame receptions. Data frames are used for transferring data information D.

The header (FIG. 2c) generally includes a synchronizing flag byte F, origin information (O), denoting the address of the originating node, destination information (D), denoting intended receiving node positions, information T representing the frame type information S denoting sequence, and information L denoting the frame (byte) length.

Upon gaining access to medium 4 (FIG. 1), a "ready to send" node sends a control or data frame out over that medium (the method for gaining access to the medium is not relevant to the present invention, and indeed it is contemplated that the present invention will operate through virtually any medium and/or access discipline). The destination byte D and type byte T in this frame's header may direct reception of its information by either one specific node or all nodes.

A frame directed to all nodes is termed a "broadcast" type frame. A node receiving a frame directed specifically to it acknowledges such reception; i.e. it returns a control frame, which contains sequence numbers associating it to the received frame and information indicating the status of its reception (error/no error). Except for certain frames associated with the present invention, broadcast frames are not acknowledged. If a frame sent to a specific destination is not acknowledged within a pre-arranged interval, the originating node assumes that its transmission (or at least the destination information therein) was not recognizable, and repeats the transmission (up to a preset "retry" limit).

The foregoing environment is representative but "primitive". As will be shown later, the concepts underlying the present invention may be applied in more sophisticated network environments wherein sub-networks associated with different channels and/or media are linked into a major network through bridges and/or gateway adapters linking the channels/media. In the foregoing representative environment, processing facilities at the nodes provide name management, session management and resource management functions—in a distributively controlled mode—which are the subject of the present invention and are described in detail below.

2. Name Creation Elements

Figure 3:
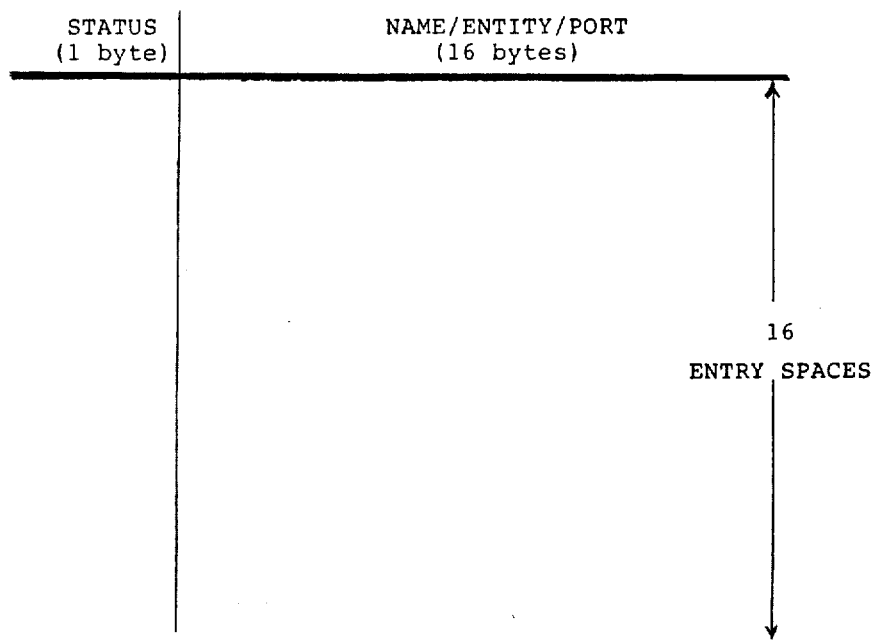
FIG. 3 illustrates the form of a nodal name table in accordance with the present invention.

In accordance with the present invention, processing facilities at the nodes maintain name tables in their memories having the form shown in FIG. 3. Each table contains only names currently assigned to entities which interface to the network through the respective node.

Entries in these tables are used at respective nodes for responding to Name Check, session establishment and other communications received through the network. Name check communications are used to verify either that a named entity exists within the network or that an entity name chosen at a transmitting node is unique within all or a part of the network. Session establishment communications are used to establish sessions (i.e. logical connections) between calling and called entities identified by names. These communications are more fully described hereinafter. They permit nodal computing systems to share resources across the network by name; i.e. without requiring translations of such communications through a central directory, or requiring each system to have detailed information as to the physical structure of the network or the paths required for linking any pair of entities. Names assigned to entities for use in session establishment should be unique across the network.

Figure 4:
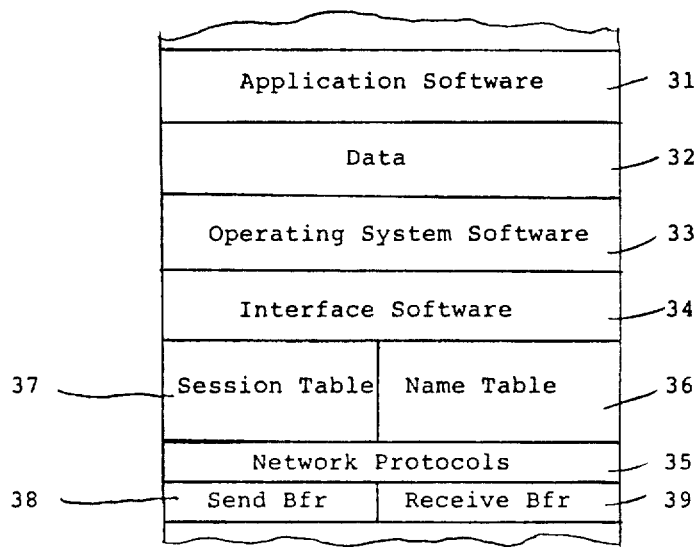
FIG. 4 is an exemplary map of a portion of memory at a processing node in FIG. 1, illustrating storage parameters of present name creation and session establishment processes and their relationships to other stored information.

Processing facilities at each subject node are organized for processing in accordance with the software hierarchy suggested in the memory map of FIG. 4. Application or utility software 31 controls the primary processor (e.g. 1b, FIG. 1) to process data 32 under the direction of supervisory software 33. Supervisor 33 also schedules I/O operations through the primary processor's I/O channels, which attach to both the secondary processor (e.g. 1c, FIG. 1) and other I/O devices. Interface software 34 sustains information exchanges between the primary and secondary processors. Network Control Programs 35 direct communications between the secondary processor and the network medium or channel (e.g. bus 4, FIG. 1). The name table referred to above is shown in a block form at 36 and a session table indicated at 37 is used to hold parameters of established session connections. Send buffers 38 hold information frames for outgoing transmission to the network medium, and receive buffers 39 temporarily store incoming frames directed to the respective node (there may be plural send buffers and plural receive buffers).

Figure 5:
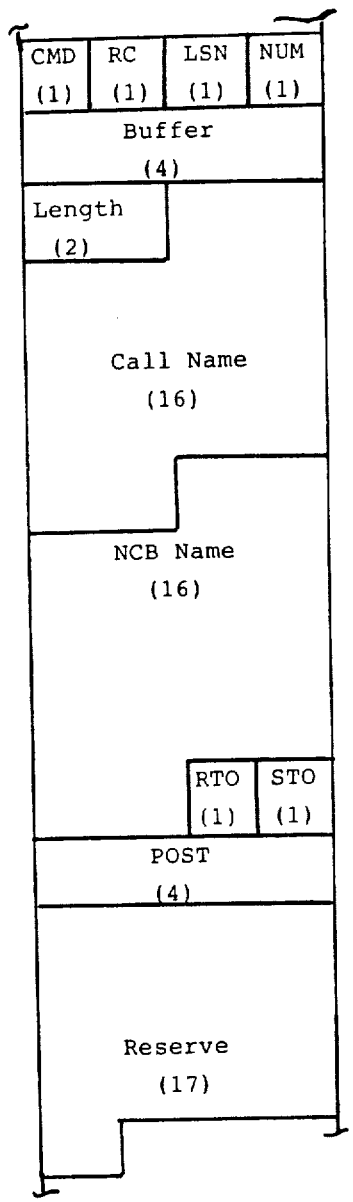
FIG. 5 illustrates the form of a Network Control Block (NCB) information array useful for name creation in accordance with the present invention.

To create a name association for an entity, the primary processing facility at a node serving that entity assembles a Network Control Block (NCB) information array (representing a command), having the form shown in FIG. 5 and schedules its interrogation by another processing entity. This other entity may be another software module running on either the primary or secondary processor, depending on the capabilities of the latter processor (if the secondary processor and primary processor have access to common memory facilities, the NCB transfer may be accomplished by a simple exchange of control signals). This NCB is used for name creation or session establishment.

The fields in the NCB array are defined in FIG. 5. The command field CMD defines the operation to be performed (NCB's can be used for many operations). If the function to be performed is name creation, the CMD term will be the operation code (30H) for an Add Name command. If the function is session establishment, the CMD code will be 10H or 11H (see FIGS. 10 and 17, and corresponding text). The NCB command evolves one of the operations described below associated with name creation and session establishment.

The field RC is used to hold a "return code" for returning to the program which was running before the NCB was fetched. Fields NUM and LSN are provided for respectively storing information relating to name and session establishment functions. When the NCB is used for name creation, the NUM field stores a number which represents the name in a shortened form. When the NCB is being used for session establishment, the LSN field stores a (local session) number which corresponds to the session and serves as a shortened notation for the identity of the session.

If the NCB is for name creation, the name to be created and information identifying its associated entity are stored in the NCB NAME field. If the NCB is for session establishment, the names of the entities to be connected are stored in the CALL NAME field.

The POST field contains the address of a program routine for posting completion status to the program which issued the NCB (the execution of the command associated with an NCB is an interruptable function, i.e. one which can be conducted "piecemeal". When the operation is concluded, either successfully or unsuccessfully, the POST address is used to access a program for transferring the concluding status information to the supervisory system software which issued the NCB).

2.1 Name Creation Operations

Figure 6:
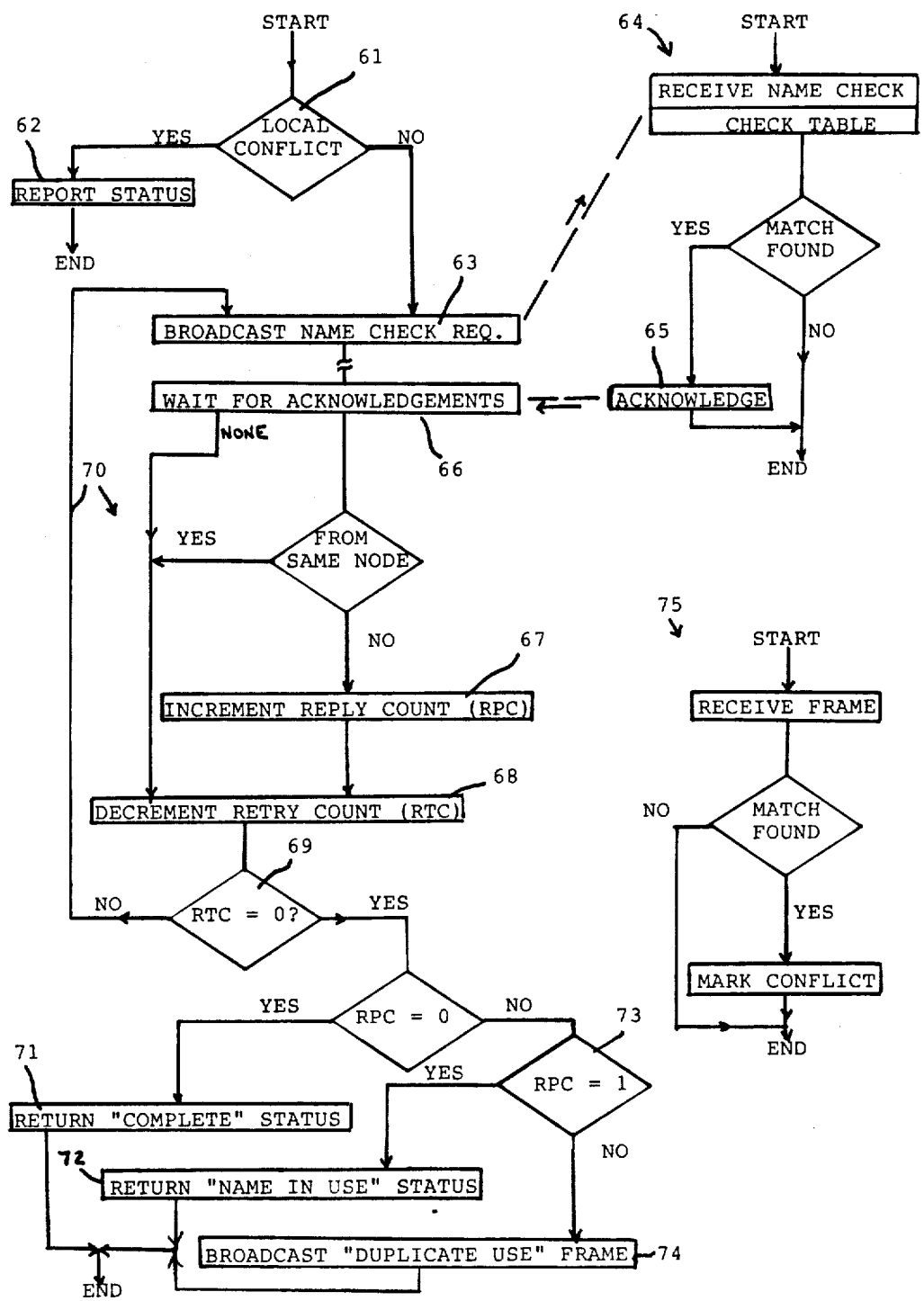
FIG. 6 illustrates the present process of name creation in a flow diagram form.

To adopt a name, the creating processor entity operates according to the flow diagram of FIG. 6 to:
  a. Check the local name table for indication of conflict in respect to use of the name specified in the NCB (operation 61, FIG. 6).
  b. Terminate the command interpretation operation if such conflict is detected, and pass a corresponding status indication to the originating program (operation 62). This may occur via conventional interruption or whatever other method is being used in the system for passing status information between program (or other) entities.
  c. If a local conflict indication is not detected, the node creates a "Name Check" packet (frame), having the form illustrated in FIG. 7a, and transmits that frame to the network (operation 63, FIG. 6). The indication that this frame has a broadcast destination (i.e. that it is to be received and interpreted at all nodes) may be provided either explicitly, by value B in the destination field, as shown in FIG. 7a, or it may be implied in the value (01) contained in the "type" field of the frame.
  d. In accordance with the present invention, nodes receiving the Name Check frame are required to check respective name tables for local use of the name specified in the frame (operation 64), and return an acknowledgment frame (operation 65) having the form illustrated in FIG. 7b if and only if a match (local duplication) is found. In the present system, and other contemporary communication systems, broadcast frames are normally not acknowledged. However, the above acknowledgment of "match found" is treated presently as an "exception" to this "general rule".
  e. The node originating the Name Check frame waits a predetermined timeout interval for acknowledgments (operation 66, FIG. 6), and then decrements a retry count function RTC which is initially set to a predetermined value (operation 68, FIG. 6). If an acknowledgment is received, a reply count function RPC initially set to 0 value, is incremented (operation 67, FIG. 6). If the value of RTC after decrementing is not 0 (decision 69), the Name Check transmission is repeated (operation path 70). If no acknowledgments are received after a predetermined number of repetitions, "good completion" status is posted (operation 71) via the NCB POST above, and the name table is updated to include an entry indicating the specified name, the entity to which it associates, its physical location at the node (I/O channel port) and status information defined later.
  f. If one and only one acknowledgment is received (RPC=1), a final "name in use" status is posted (operation 72), indicating name duplication and requiring selection of another name.
  g. If more than one acknowledgment is received ("no" path at decision 73), "name in use" status is posted and the node creates and broadcasts a "Duplicate Use" frame (operation 74) having the form shown in FIG. 7c. This frame does not require acknowledgment. Nodes receiving it check their tables for the specified name (operation 75) and if a match is found, the table entry is marked as in conflict (such entries are not used until the conflict is resolved).

Upon completion of any of the foregoing operations, a final status indication is posted, as explained previously, indicating the state of the operation.

When a name has been assigned to an entity at a node via the foregoing procedure, the association between the name and entity may be communicated to other nodes by means not presently relevant (e.g., telephone calls between operators) so that the other nodes may share access to the entity via sessions (to be described).

3. Session Establishment

In the present system, point-to-point communications between pairs of entities served by processing facilities at either a single node or two different nodes are conducted via "sessions". A session is a logical connection between a pair of entities (e.g. an operator at a keyboard served by one node and a storage file maintained at another node). A session may span multiple network frames. Sessions are initiated when entities such as application programs or keyboard operators require reference to other entities such as storage files.

Upon receipt of a suitable interruption request from a "calling entity" (an entity requiring reference to another entity, herein termed "called entity"), operating system software serving the calling entity sets up an NCB for creating a session with the called entity. If the calling entity is an application program, it may be free to continue other useful work provided that its continued operation is not dependent on the reference to the called entity.

This session initiating NCB (FIG. 10), specifying the calling and called entities by name, is passed to another processing entity for interpretation (either to another virtual processor or software module in the primary processor or to the secondary processor). The NCB contains a Call command evoking the operations illustrated in the two parts of FIG. 9, FIGS. 9A and 9B.

The interpreting processor first checks its local Name Table (operation 200, FIG. 9A). If both named entities are attached locally, and the called entity is in "listening status" as defined later, a local (or intra nodal) session is established (operation 202, FIG. 9A) by entry of information in the Session Table (FIG. 10). This entry includes the names of the calling and called entities, their physical locations and identities, a bit flagging the session as local, and a session number (a pair of entities may have more than one session in process concurrently, and this number allows the local system to associate communications between the pair with the correct session). Thereafter, communications in either direction between these entities are initiated by name (or name number), passed to the processor responsible for maintenance of the Session Table and routed by that processor to the appropriate application and entity via reference to the session number.

If the called entity is not local, the processor originating the NCB causes a Call Name Check frame (FIG. 7d) to be broadcast to the network (Operation 204, FIG. 9A) for checking the existence of the name of the called entity, and examines acknowledgments (FIG. 7b). Call Name Check differs from Name Check (FIG. 7a) in the type field value (08 for Call Name Check; 01 for Name Check) and in the "context" of the name field (which represents a "called" entity name rather than a name proposed for adoption). This permits the optional Name Management facility of paragraph 2.4 above to ignore/allow unrestricted Call Name Check communications. This is true also for the acknowledgments.

This broadcast is repeated a predetermined number of times, via retry path 206, FIG. 9A, to ensure accurate transfer of the request and interpretation of responses. If no acknowledgment or more than one acknowledgment is received, the NCB processor sets a Call Name Not Found status indication (208, FIG. 9A) which terminates the operation on an unsuccessful basis. Also, if more than one acknowledgment returns (for a single repetition of the Name Check frame), the NCB processor creates and broadcasts a Duplicate Use frame (210, FIG. 9B) as described previously for name creation. If only one acknowledgment is returned, the calling node broadcasts a Call Request packet (212, FIG. 9B), having the form shown in FIG. 11, which is acknowledged by a Listen Acknowledgment packet (214, FIG. 9B) having the form shown in FIG. 12, if correctly broadcast and received, and if the called entity is in Listening status as defined below.

The Call Request and Listen Acknowledgment frames contain session numbers, and establishment of the session is conditional upon these numbers matching. If these numbers match, the calling node sends a specifically addressed Call Confirmation frame (216, FIG. 9B) having the form shown in FIG. 13 to the node serving the called entity. The latter frame, if properly received, is acknowledged by a "Listen Confirmation" frame (218, FIG. 9B) with form of FIG. 14. Then, the processors serving the calling and called nodes make appropriate entries in their session tables establishing the session (identifying the paired entities, their session number and their physical locations in the network). Thereafter, communications in either direction between these entities are initiated by name and translated (via the Session Table) into point-to-point frames indicating the session number and unit identities.

Considering now the "listening" state mentioned above, supervisory software modules at the nodes use "LISTEN" NCB's of the form shown in FIG. 15 to establish such states. These NCB's, containing Listen commands directed to named "caller" entities, are passed to respective processing entities which refer to respective Name Tables and pass back to the NCB source processor the physical identity and operating status of the caller entity. If that entity is available for Session Establishment, relative to the listenee/called entity named in the NCB, the NCB source processor signals the NCB evaluating processor to mark listening status in the Name Table, to associate that status with the listenee entity and relate it to the caller entity.

Consequently, if a node receives a Call Request and has suitable listen status pre-marked for the called entity, it will return a Listen Acknowledgment. This procedure thereby allows each node to govern its session traffic.

It should be appreciated that the foregoing procedures for Name Creation and Session Establishment allow a resource at any node to be shared across the network by name. These processes operate discretely separate from application processes running at the nodes, and permit the application processes and associated operating system software to call for a resource by name without knowing the physical location of that resource in the network.

4. Extension of Name Communications Through Nodal Bridges and Gateways

The foregoing process for Name Creation can be extended across networks operating through different media or on different channels of a common medium. Such networks may be linked physically through nodal adapters providing bridging or gateway access as explained previously. The extensions are accommodated as follows:

4.1 Extended Name Creation a. Consider the simple configuration of FIG. 17, in which three networks—A, B and C—are linked for intercommunication via gateways 300, 302 and 304; gateway 300 linking node 300a in A with node 300b in B, gateway 302 linking node 302a in A with node 302c in C, and gateway 304 linking node 304b in B with node 304c in C.

b. Subject to hop count restrictions defined later, assume that Name Check and Call Name Check requests originating at a node in one network are forwarded unconditionally to the other networks through these gateways; whereby requests in A are forwarded to B and C via 300 and 302, requests in B are forwarded to A and C via 300 and 304, and requests in C are forwarded to A and B via 302 and 304. Assume also that acknowledgments and other communications associated with these requests (e.g. Duplicate Use frames) are similarly forwardable.

c. It should be apparent, from earlier discussions, that these requests would be transmitted with the intent to establish name/entity associations which would potentially extend across media or channel boundaries.

d. Note that without topological restrictions, such requests could circulate endlessly. For instance, a communication originating in A could recirculate to A; either through 300, B, 304, C and 302; or through 302, C, 304, B and 300.

e. To prevent this undesirable/unproductive multiplication of network traffic, it is required presently that any node originating a broadcast communication pertaining to Name Creation or Session Establishment provide a "hop count" number with that communication to restrict its transfer across network boundaries. This number (see FIGS. 7 and 11–14) indicates the number of network boundaries which the communication may cross.

f. Such communications may be transferred across boundaries either immediately, or held at the gateway and forwarded only if fewer than two acknowledgments are returned within the forwarding network (the latter procedure is slightly more complex and costly, but would reduce internetwork traffic by eliminating unnecessary forwarding communications after conditions indicative of Duplicate Name Use have been established).

g. In the foregoing example, the count would be set at 2, and decremented by 1 as the message containing it crossed any gateway. Thus, a Name Check originated in network A could transfer to B and C, through 300a and 302a respectively, and its hop count would be decremented to a value of 1 at each of these junctures. Corresponding messages could be cross-forwarded between B and C, through 304, with second decrements to their residual hop counts setting their values to 0. The 0 hop count value would prevent further forwarding so that the messages crossing between B and C could not re-enter A. This hop count function could be determined either by the nodes individually or by having a common node issue messages to all other nodes setting hop count restrictions for their name associated communications. The specific method is not considered relevant to the present invention. However, it should be noted that this determination must be based at least on knowledge of the linkage topology between the network media and/or channels.

h. An alternative to the use of the above hop count parameter would be to have each forwarding node insert an identifying tag in its forwarded messages. Then, if a gateway serving a node sees the tag of that node in an incoming message directed toward that node, it would not re-forward the message An additional requirement in the forgoing message forwarding system is that the timeout functions employed at the nodes for timing responses to Name Check and session creation communications must be tailored to the network system topology; i.e. such timeouts must be functionally related to the maximum communication delay in the system. If linked networks in a system have different delays, these timeouts may be related to the sum of the delays through all networks.

5. Conclusions

We have therefore described a method for enabling processors at individual nodes within a distributed processing network to create name associations for entities at respective nodes without having to communicate specifically with a central or controlling node, and a method for enabling such processors to use such names for establishing sessions between entities, whereby the processors and application programs running on the processors can initiate sessions without specific knowledge of the network topology or the physical locations of the entities in the network.

We claim:

1. For a data communication network comprising multiple computing nodes linked by communication media and/or channels, each node serving one or more entities, a method of establishing logical name associations between nodes and their respectively served entities, for permitting programs and/or operators at said nodes to share entities dispersed across said network and initiate communications with said entities by associated names without having to determine physical locations of said entities, comprising:

maintaining name association tables at said nodes indicating names adopted at said nodes for respectively served entities;

at any node seeking to adopt a new name association, broadcasting a Name Check request message over said network indicating the name to be adopted and the physical address location in said network of the node proposing the adoption;

receiving said request at other nodes, and comparing the proposed name with names stored in the name association tables at said other nodes;

at any of said other nodes finding a name in their table matching the proposed name, transmitting an acknowledgment message over said network addressed specifically to the node which originated said Name Check request; and at the node which originated said Name Check, adopting or rejecting said name conditional upon the number of said acknowledgments received in response to said Name Check.

2. A method of establishing name associations as defined in claim 1 wherein said adoption or rejection of the proposed name, by the node which originated said Name Check request, is determined by:

timing out a predetermined time interval after transmission of said Name Check request;

counting the number of acknowledgments received during said interval;

rejecting the name if one or more acknowledgments are received during said interval; and adopting the name if no acknowledgments are received during said interval.

3. A method of establishing name associations as defined in claim 1 comprising:

repeating said Name Check broadcasting and comparing and acknowledging actions for a predetermined number of times;

timing out a predetermined interval at the node originating said Name Check after each broadcasting of said Name Check and before the next broadcasting thereof;

in each said interval, monitoring the acknowledgments received from other nodes in response to the respective Name Check broadcast;

adopting the proposed name if no acknowledgments are received during any one of said timeout intervals; and rejecting the proposed name if one or more acknowledgments are received during each of said timeout intervals.

4. The name adoption method of either claim 2 or claim 3 comprising:

broadcasting a Duplicate Use message over said network if more than one acknowledgement is received during a said timeout interval at the node which broadcast said Name Check request message, said Duplicate Use message indicating said proposed name and its adoption at more than one of said acknowledging nodes;

receiving said Duplicate Use message at said other nodes which received said Name Check message, and comparing said proposed name with names stored in respective said name association tables;

at said other nodes having matching name entires in respective name tables, entering into respective tables Duplicate Use indications in association with the respective matched name entries, each said indication denoting use of the associated name at more than one of said nodes; and at said other nodes having Duplicate Use indications entered into respective name tables, inhibiting operations requiring use of the respective matching name.

5. The method of name adoption of claim 1 comprising:

at any node seeking to adopt a new name association, checking the respective name table for entries indicating existing association of the name with an entity;

rejecting adoption of the new name association if there is an existing local association, and in that instance eliminating said Name Check broadcasting step; and proceeding with said Name Check broadcasting step and other operations conditional thereon only if a local association is not found.

6. For a data communication network comprising multiple computing nodes, each node serving one or more entities which may be shared by other nodes, each node having a physical address in said network and being capable of having one or more alias names associated with either the node or its respectively served entities, a method for establishing a communication session between a pair of entities having associated alias names, using only the associated names and not information regarding the physical locations of the entities, comprising:

maintaining name association tables at said nodes for storing indications of logical names associated with respectively served entities;

at a node seeking to establish a session between a respectively served first entity having a first name and a second entity having a second name, comparing said second name to the names stored in the name association table maintained at the respective node;

establishing a session between said first and second entities, by means of processing operations performed entirely within the respective node—i.e. without any communications over said network—if the second name matches a name stored in the respective name table; and if the second name does not match any name in the respective name table, successively broadcasting a Call Name check message over said network from the node seeking to establish said session, said message containing said second name and the address in said network of the node originating the broadcast;

timing out a predetermined time interval at said originating node immediately following said broadcast;

receiving said Call Name check message at other nodes in said network;

at each said other node, comparing the second name in said received message with names stored in the respective table and transmitting an acknowledgment message directed by address specifically to the node which broadcast the Name Check message if and only if a match is detected between said second name and a name in the respective table;

at the node which originated the Name Check broadcast, monitoring acknowledgments of said broadcast received during said timeout interval; and conditional upon said received acknowledgments, either initiating further communications with an acknowledging other node, for continuing the process of seeking to establish said session, or aborting said process.

7. The method for establishing a communication session of claim 6 wherein said further communications include:

sending a call request communication from said node seeking to continue said process to said second entity; and returning an acknowledgement in response to said call request from the node serving said second entity to the node which sent the call request.

8. The method of claim 7 wherein said nodes are adapted for establishing Listening State associations between respectively served entities and other entities, for regulating communication traffic between entities, and said second acknowledgment is given only on condition that a Listening State association pre-exists between said second name and said first name at a node serving an entity associated with said second name and receiving a said Call Request.

9. The session method of claim 6 including:

continuing said process if only one acknowledgement is received in response to said Name Check broadcast and aborting said process if either no acknowledgement or more than one acknowledgement is received in response to said Name Check broadcast; and in response to receipt of more than one acknowledgement of said Name Check broadcast, broadcasting a Duplicate Use message over said network from said node which originated said Name Check broadcast, said Duplicate Use message indicating existance of conflicting name usage and having the effect of informing the computing systems at the nodes which acknowledged the Name Check broadcast that their uses of said second name are conflicting.

* * * * *